Figure 1:
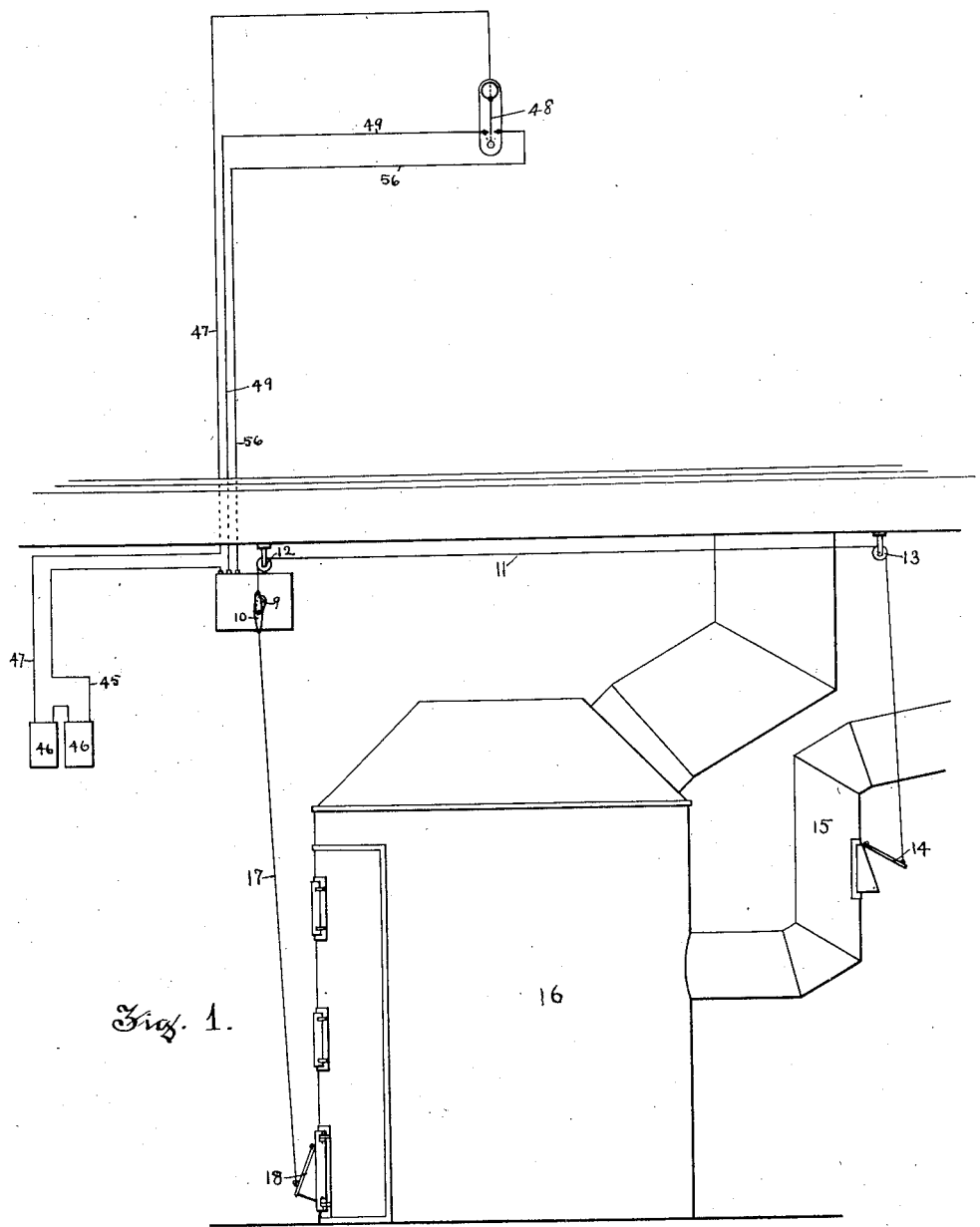

(No Model.)  8 Sheets—Sheet 1.

W. B. LORING.
AUTOMATIC TEMPERATURE REGULATING APPARATUS.

No. 603,696. Patented May 10, 1898.

Witnesses  Inventor
 Walter B. Loring
By his Attorney
 John C. Dewey.

(No Model.) 8 Sheets—Sheet 3.
W. B. LORING.
AUTOMATIC TEMPERATURE REGULATING APPARATUS.
No. 603,696. Patented May 10, 1898.

Witnesses
Inventor
Walter B. Loring.
By his Attorney
John C. Dewey (No Model.) 8 Sheets—Sheet 4.

W. B. LORING.
AUTOMATIC TEMPERATURE REGULATING APPARATUS.

No. 603,696. Patented May 10, 1898.

Witnesses
A.C. Whiting
M.J. Galvin

Inventor
Walter B. Loring
By his Attorney
John C. Dewey (No Model.) 8 Sheets—Sheet 5.

W. B. LORING.
AUTOMATIC TEMPERATURE REGULATING APPARATUS.

No. 603,696. Patented May 10, 1898.

Witnesses
Inventor
Walter B. Loring
By his Attorney
John C. Dewey.

(No Model.) 8 Sheets—Sheet 6.
W. B. LORING.
AUTOMATIC TEMPERATURE REGULATING APPARATUS.
No. 603,696. Patented May 10, 1898.
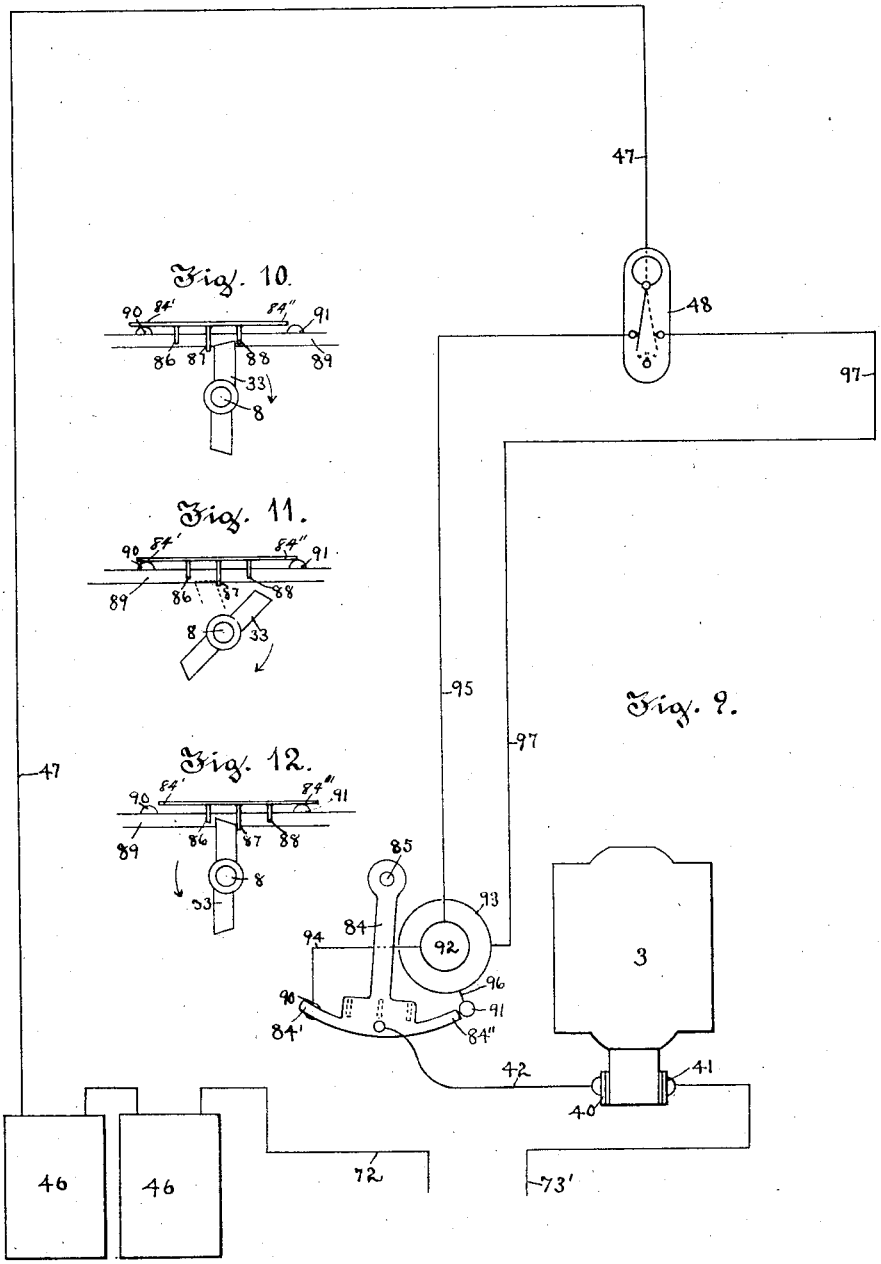
Witnesses
Inventor
Walter B. Loring
By his Attorney
John C. Dewey (No Model.)  8 Sheets—Sheet 7.
W. B. LORING.
AUTOMATIC TEMPERATURE REGULATING APPARATUS.
No. 603,696.  Patented May 10, 1898.
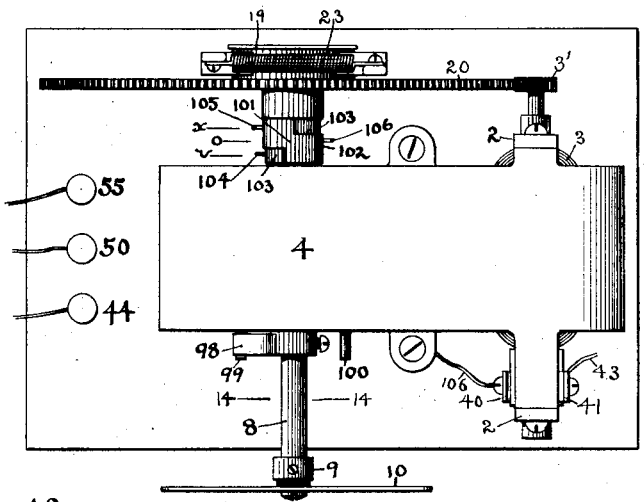
Fig. 13.
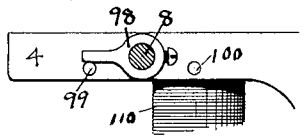
Fig. 14.
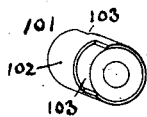
Fig. 15.
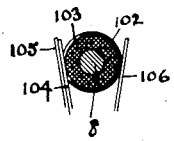
Fig. 17.
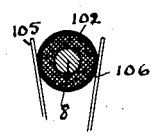
Fig. 18.
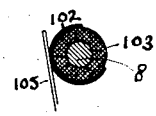
Fig. 19.
Fig. 16.
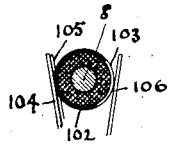
Fig. 20.
Fig. 21.
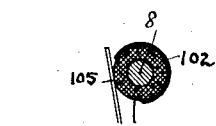
Fig. 22.
Witnesses
A. Whiting
A. J. Galvin
Inventor
Walter B. Loring.
By his Attorney
John C. Dewey (No Model.)  8 Sheets—Sheet 8.

W. B. LORING.
AUTOMATIC TEMPERATURE REGULATING APPARATUS.

No. 603,696. Patented May 10, 1898.

Witnesses
A. C. Whiting
M. J. Galvin

Inventor
Walter B. Loring.
By his Attorney
John C. Dewey

United States Patent Office.

WALTER B. LORING, OF WORCESTER, MASSACHUSETTS.

AUTOMATIC TEMPERATURE-REGULATING APPARATUS.

SPECIFICATION forming part of Letters Patent No. 603,696, dated May 10, 1898.

Application filed November 5, 1896. Serial No. 611,121. (No model.)

*To all whom it may concern:*

Be it known that I, WALTER B. LORING, a citizen of the United States, residing at Worcester, in the county of Worcester and State of Massachusetts, have invented certain new and useful Improvements in Automatic Temperature-Regulating Apparatus, of which the following is a specification.

My invention relates to an automatic temperature-regulating apparatus designed to be used in connection with any well-known apparatus for supplying artificial heat to buildings, &c., as a coal-furnace, a hot-water or steam apparatus, &c.; and the object of my invention is to provide an automatic temperature-regulating apparatus of simple construction and operation to regulate the temperature of buildings and to be operated by electricity.

My invention consists in certain novel features of construction of my apparatus, as will be hereinafter fully described.

I have shown in the drawings the simplest form of my apparatus applied to a coal heating-furnace; but it will be understood that it may be applied to other heating or even ventilating apparatus, and the parts thereof may be duplicated.

Figure 2:
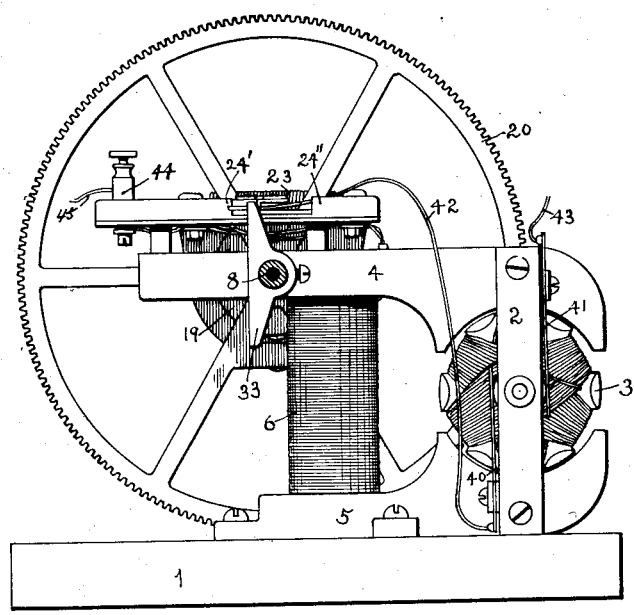
Figure 3:
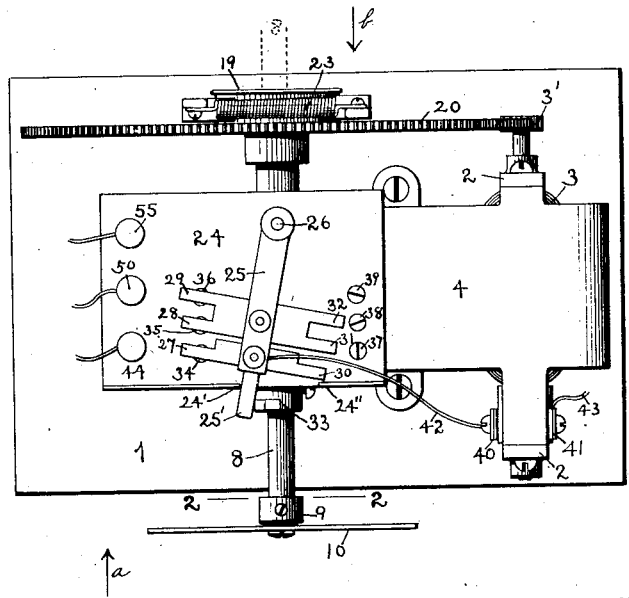
Figure 4:
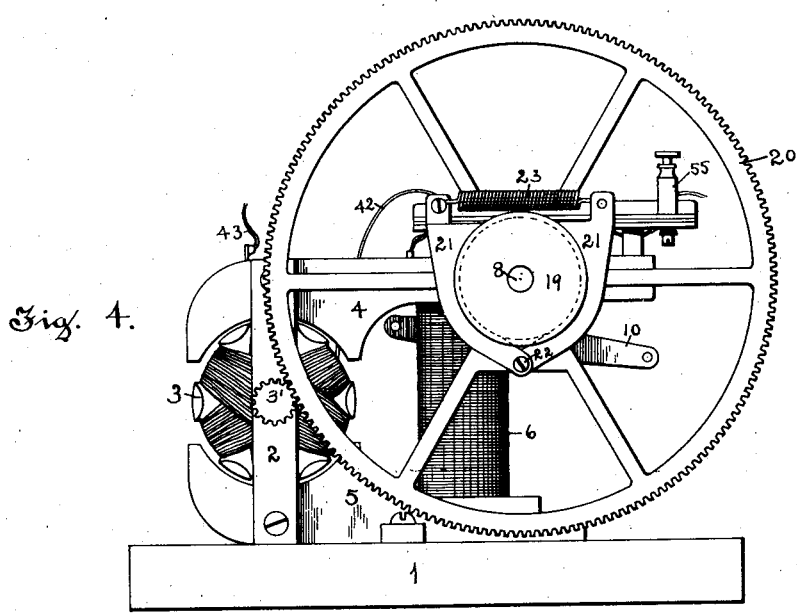
Figure 5:
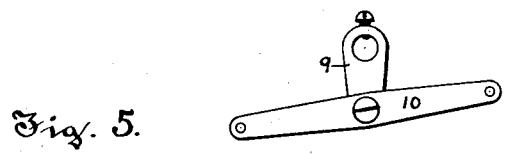
Figure 6:
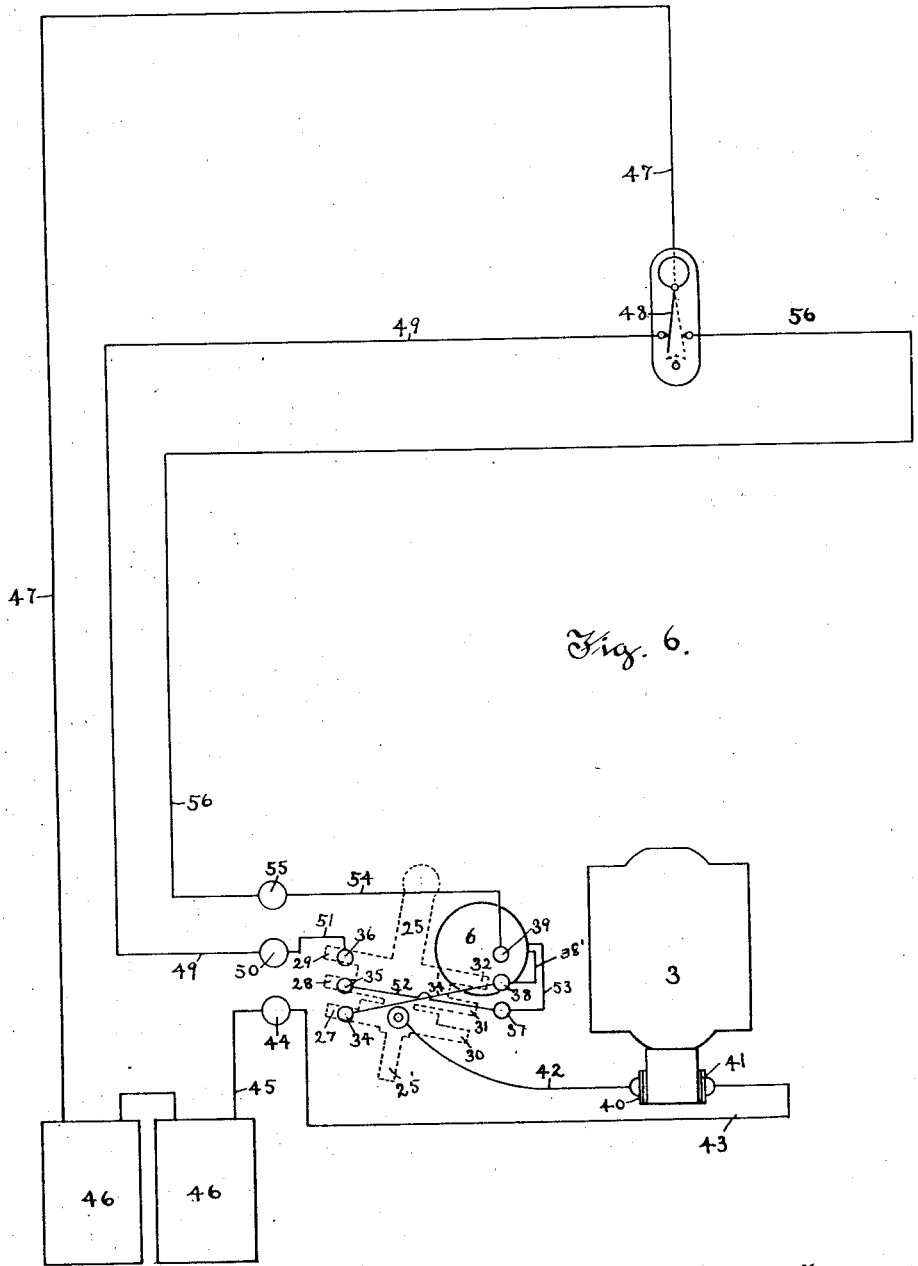
Figure 7:
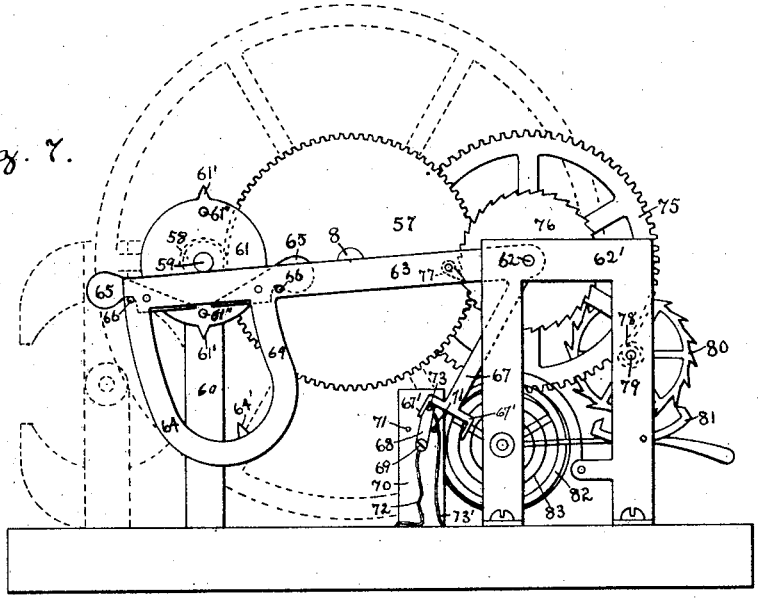
Figure 8:
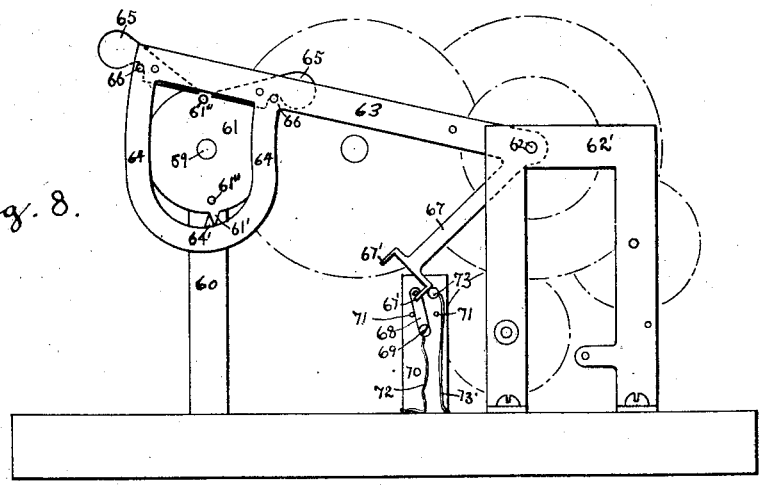

Referring to the drawings, Figure 1 is a diagrammatic view of my apparatus applied to a coal heating-furnace of ordinary construction and operation. Fig. 2 is a side view of my electric-motor apparatus, taken on line 2 2, Fig. 3, looking in the direction of arrow *a*, same figure. Fig. 3 is a plan view of the parts shown in Fig. 2. Fig. 4 is an opposite side view from that shown in Fig. 2, looking in the direction of arrow *b*, Fig. 3. Fig. 5 shows the pivoted connector for the connection to the dampers shown in Fig. 3 detached. Fig. 6 is a diagrammatic view of the wire connections to the apparatus shown in Fig. 3. Only parts of said apparatus are shown in this figure. Fig. 7 shows a supplemental apparatus combined with the apparatus shown in Fig. 4 to control the movement thereof and cause it to stop at predetermined intervals. The operating-lever is shown in its lowered position. Fig. 8 shows the operating-lever in its raised or reverse position. Fig. 9 is a diagrammatic view corresponding to Fig. 6, but showing a modified construction of the switch mechanism to be used with the supplemental attachment shown in Figs. 7 and 8. Figs. 10, 11, and 12 are details showing different positions of the switch and operating-lever shown in Fig. 9. Fig. 13 corresponds to Fig. 3, but shows a modified construction of the switch mechanism, the switch being directly on the shaft of the motor apparatus. Fig. 14 is a sectional detail on line 14 14, Fig. 13, looking in the direction of arrow *c*, same figure. Fig. 15 is an end perspective view of the switch shown on the shaft in Fig. 13 removed. Fig. 16 is a view of the under side of the switch shown in Fig. 13 or a top view of the switch when the shaft on which it is fast has made a half-revolution from the position shown in Fig. 13. Fig. 17 is a section through the shaft and switch, taken at a point indicated by line *v*, Fig. 13, looking in the direction of arrow *c*, same figure, and when the switch is in the position shown in Fig. 13. Fig. 18 is a section taken at line *o*, Fig. 13. Fig. 19 is a section taken at line *x*, Fig. 13. Fig. 20 is a section taken at line *v*, Fig. 13, after a half-revolution has been given to the shaft and the switch to bring the switch into the position shown in Fig. 16. Fig. 21 is a section taken at line *o*, Fig. 13, when the switch is in the position referred to in Fig. 20. Fig. 22 is a section taken at line *x*, Fig. 13, when the switch is in the position referred to in Fig. 20; and Fig. 23 corresponds to Fig. 6, but is a diagrammatic view of the wire connections to the apparatus shown in Fig. 14. Only parts of said apparatus are shown in this figure.

I will first describe my electric-motor apparatus.

1 is the base; 2, the bearings between which the armature 3, of ordinary construction and operation, is mounted. Extending between the bearings 2 and over and below the armature 3 are the field castings or poles 4 and 5 of the field-piece, and 6 is the field-coil, all of ordinary construction and operation. In the field-castings are bearings for the shaft 8, which at one end has in this instance a crank-arm 9 fast thereon, on the outer end of which is pivotally supported a connector 10. To one end of said connector 10 is attached in this instance a cord 11, leading over pulleys 12 and 13 to a check-damper 14 in the smokepipe 15 of a coal heating-furnace 16. (See Fig. 1.) To the other end of said connector 10 is secured in this instance a second cord 17, leading to the draft-damper 18 in 'the lower part of the furnace 16. It will thus be seen that as the crank-arm 9 rotates in one direction or the other, according to the rotation of the shaft 8, the check 14 and damper 18 will be opened or closed.

On the opposite end of the shaft 8 from the crank-arm 9 is secured a disk 19, preferably provided with a grooved edge, and contiguous to said disk 19 a toothed wheel or gear 20 is loosely mounted on said shaft 8 and meshes with and is driven by a pinion 3' on the shaft of the armature 3. (See Fig. 4.) The gear 20 is connected to the shaft 8 to drive said shaft in this instance by a spring-actuated friction-clutch (see Fig. 4) consisting of the two members 21, which are pivoted at 22 on the gear 20 and extend upon opposite sides of and in frictional engagement with the periphery of the disk 19, fast on the shaft 8, and are drawn toward each other and held in engagement with said disk 19 by a coil-spring 23, connecting the free ends of said members 21. It will thus be seen that the rotation of the gear 20 through the friction-clutch device and disk 19 will rotate the shaft 8; but in case the rotation of the shaft 8 is checked or stopped in the manner to be hereinafter described the gear 20 may continue to rotate, the members 21 of the friction-clutch slipping around on the periphery of the disk 19 by the expansion of the spring 23 until the momentum of the gear 20 ceases.

It will be understood that the disk 19 may be attached to and move with the gear 20 and the two clutch members 21 be pivoted on an arm fast on the shaft 8 and move with said shaft and the same result be obtained as above described, the disk on the gear revolving within the two members 21 after the revolution of the shaft and the movement of said members has been stopped, and it will be understood that other forms of clutches of well-known construction and operation may be used.

Arranged over the shaft 8 is in this instance a horizontal switchboard 24, on which is arranged a switch-lever 25, pivoted at 26, and having in this instance three outwardly-extending contact-springs 27, 28, and 29 and 30, 31, and 32 on opposite sides thereof and insulated therefrom. (See Fig. 3.) The end 25' of the switch-lever 25 extends beyond the edge of the switchboard 24 and is in line with and adapted to be engaged by the two-arm lever 33, fast on the shaft 8. (See Figs. 2 and 3.) When the shaft 8 revolves in one direction, the lever 33 revolves with it, and one end of said lever 33 engages the end 25' of the lever 25 and moves it to the left, as shown in Fig. 3, to bring the contact-springs 27, 28, and 29 in contact with the three contact-points 34, 35, and 36. The end 25' of the lever 25 strikes against the stop or projection 24' on the switchboard 24 and thus checks or stops the revolution of the lever 33 and the shaft 8; but the gear 20, which drives said shaft, can continue to revolve, as above explained. When the shaft 8 and lever 33 are revolved in the opposite direction, the lever 33 will move the switch-lever 25 to the right in Fig. 3 to bring the contact-springs 30, 31, and 32 in contact with the contact-points 37, 38, and 39, and the end 25' of the lever 25 will strike against the stop or projection 24" on the switchboard 24 to stop the revolution of the lever 33 and the shaft 8.

In connection with the armature 3 two brushes 40 and 41 of ordinary construction and operation are used, arranged on opposite sides of the commutator. In this instance a wire or conductor 42 leads from the brush 40 to the front contact-springs 27 and 30 on the switch-lever 25. (See Figs. 3 and 4.) A wire or conductor 43 leads from the brush 41 to a binding-post 44 on the switchboard 24, (see Figs. 2 and 6,) and from said post 44 a wire or conductor 45 leads to the battery-jars 46 or other electric generator. (See Fig. 6.) From said jars 46 a wire or conductor 47 (see Fig. 6) leads to the thermostat finger or lever 48, which in this instance is shown moved to the left in Fig. 6 and in contact with a wire or conductor 49, leading to the middle binding-post 50 on the switchboard 24, and from said post through wire 51 to the rear left-hand contact-point 36, and through the contact-springs 29 and 28 to the middle contact-point 35, and from said point 35 through wire 52 to the front contact-point 37, and from said point 37 through wire 53 to the field-coil 6, and through said field-coil 6 to the middle contact-point 38, and from said point 38 through wire 34' to the contact-point 34 in contact with the spring 27, and through spring 27, connection 42, brush 40, armature 3, brush 41, and connector 43 to the jars 46, thus making a complete circuit and electrical connection. While this circuit remains the motor is kept in motion, causing the shaft 8 to revolve and also the arm or lever 33 until said arm engages and moves the switch-lever 25 to the right in Fig. 3 and breaks the circuit. As this circuit is broken the contact-springs 30, 31, and 32 come in contact with the three contact-points 37, 38, and 39, and the lever 25, striking against the stop 24", stops the revolution of the arm 33 and the shaft 8, and the gear 20 will stop at the end of its momentum.

Until the thermostat-finger 48 engages the conductor 56 the motor will remain at rest; but when said finger is moved to the right (see dotted lines, Fig. 6) and engages said conductor 56 then the circuit is completed or closed and the motion is reversed to revolve the shaft 8 and arm 33 in the opposite direction by the current passing through wire 56, binding-post 55, conductor 54, contact-point 39, spring-plates 32 and 31, contact-point 38, conductor 38', and through the field-coil 6 from the opposite end thereof from which it went before and through conductor 53, contact-point 37, spring-plate 30, conductor 42, brush 40, armature 3, brush 41, and conductor 43 to generator 46, thus completing the circuit. This reverse motion of the motor causes the arm 33 to revolve in the opposite direction and engage and move the lever 25 to the left in Fig. 6. Then the circuit is broken, and the switch-lever 25 is in position to start the motor in the manner first described, when the thermostat-finger 48 goes back to its first position. It will thus be seen that according as the thermostat-finger 48 moves to the right or left, affected by the temperature in the ordinary way, the motor is operated in one direction or the other to open or close the draft-damper and the check-damper, and the dampers will remain open or closed until the movement of the thermostat closes the circuit and puts the motor which moves the damper in operation.

The motor is automatically controlled by the thermostat and the switch-lever 25.

I will now proceed to describe my supplemental attachment, (shown in Figs. 7 and 8,) adapted to be combined with the motor apparatus, (shown in Figs. 2, 3, and 4,) except that the switch mechanism shown in Figs. 9 to 12, inclusive, is substituted for the switch mechanism shown in Figs. 1 and 3, and two field-coils are substituted for the single field-coil.

The object of my supplemental attachment is to automatically regulate the supply of air which passes through the damper or valve openings by partially opening or closing said dampers instead of fully opening or closing them, as is done by the apparatus heretofore described. My supplemental attachment is also designed to be used in connection with what is ordinarily termed "mixing-dampers," where both cold and hot air are admitted at the same time or only hot air or cold air is admitted, the amount being regulated by the movement of the damper or dampers, and this movement in this instance is controlled automatically by my supplemental attachment in connection with the motor apparatus, electrical connections, and thermostat shown in the drawings and previously described.

In Fig. 7 are shown by dotted or broken lines portions of the motor shown in Fig. 4. By full lines are shown my supplemental attachment to be used in connection with said motor, and also an ordinary clock-movement, which is shown in this instance combined with my supplemental attachment.

In Fig. 7 a gear 57 is fast on the shaft 8 of the gear 20, and in this instance is arranged upon said shaft at the outside of the disk 19. (Shown in Fig. 4.) The gear 57 meshes with a pinion 58, (see dotted lines, Fig. 5,) fast on a shaft 59, supported in bearings in a stand 60. Also fast upon said shaft 59 is a disk 61, provided on its periphery with two outwardly and oppositely extending points 61', also with two pins 61" on its outer face. On a shaft 62, mounted in a stand 62', is loosely mounted a rocking lever 63. The outer end of said lever 63 is preferably provided with a U-shaped loop or extension 64 thereon, at the lower part of which and extending upwardly is a projection 64'. Pivoted on the lever 63 are two dogs 65, provided with weighted heads or ends, which act to hold the lower edge of said dogs outside of their pivot-points in engagement with pins 66 on the lever 63. Extending downwardly from the inner pivotal end of the lever 63, and in this instance made integral therewith, is an arm 67, having a yoke or fork shaped end, the ends 67' of which are adapted to engage with a switch-lever 68, pivoted at 69 on a stand 70. On said stand 70 are stop-pins 71, arranged on opposite sides of the lever 68 to limit the motion thereof. A wire or conductor 72 leads from the switch-lever 68 to the electric generator. (See Fig. 9.)

In Fig. 7 the switch-lever 68 is shown moved to the right and in contact with the contact-point 73, (see Fig. 7,) which point is connected by a wire 73' with the brush 41 to complete the circuit, (see Fig. 9,) while in Fig. 8 the switch-lever 68 is shown moved to the left, out of contact with the contact-point 73, to break the circuit. In connection with the operating-lever 63 I employ in this instance a clock-movement of ordinary construction and operation and consisting of the gear 75, fast on the shaft 62, on which the lever 63 is loosely mounted. A ratchet 76 is also fast on said shaft and adapted to be engaged by a spring-actuated pawl 77, pivoted on the lever 63. A pinion 78 on a stud 79 engages the gear 75. An escapement-wheel 80 is also mounted on said stud 79. An escapement-lever 81, balance-wheel 82, and hair-spring 83 are employed, all of the ordinary construction and operation.

Instead of the switch mechanism shown in Figs. 3 and 6 I preferably employ in connection with my supplemental attachment the switch mechanism shown in Fig. 9, consisting of a switch-lever 84, pivoted at 85 and adapted to move in a horizontal plane. The lever 84 is provided with two oppositely-extending projections 84' and 84", which are insulated from the lever 84. Extending down from the lower surface of the lever 84 are three projections 86, 87, and 88, which lie in the path of and are adapted to be engaged by the two-armed lever 33 on the shaft 8, forming a part of the apparatus shown in Figs. 2, 3, and 4.

On the switchboard 89 are two contact-points 90 and 91. There are also two field-coils 92 and 93, in this instance one arranged inside of the other. From the contact-point 90 a wire or conductor 94 leads to the inner field 92. From said field a wire or conductor 95 leads to the thermostat 48. From the contact-point 91 a conductor 96 leads to the outer field 93, and from said field a wire or conductor 97 leads to the thermostat 48. From the thermostat 48 a wire or conductor 47 leads to the battery-jars 46 in a similar manner as shown in Fig. 6. From the jars 46 a wire or conductor 72 leads to the switch-lever 68, (shown in Figs. 7 and 8,) and from the contact-point 73, with which said lever is adapted to come in contact to complete the circuit, a wire or conductor 73' (see Figs. 7 and 8) leads to the brush 41 of the armature 3. (See Fig. 9.) From the brush 40 a wire or conductor 42 leads to the arms 84' and 84" of the lever 84, (see Fig. 9,) said arms being insulated from the lever proper.

The operation of my supplemental attachment, in connection with the apparatus already described, is as follows: Suppose the parts of the supplemental apparatus to be in the position shown in Fig. 7 and the switch-lever 84 in the position shown in Figs. 9 and 10—that is, the current closed, so that the motor will operate. Referring to Fig. 7, it will be seen that the revolution of the disk 61 will cause the lower pin 61' to engage with the lower edge of one of the dogs 65 in front of its pivot-point. This engagement and the revolution of the disk 61 will cause the operating-lever 63 to be raised into the position shown in Fig. 8. At the same time the operation of the motor will cause the shaft 8 and lever 33 to revolve in the direction indicated by the arrow, Fig. 10, and the upper end of said lever coming in contact with the projection 88 will move the lever 84 to the right, so that the end 84" will come in contact with the contact-point 91, as shown in Fig. 11, and the lever 33 will move out of engagement with the projection 88 on the lever 84. (See Fig. 11.) When the operating-lever 63 has been raised to the position shown in Fig. 8, the switch-lever 68, through the arm 67, has been moved to the left, as shown in Fig. 8, and out of contact with the contact-point 73, so that the electric circuit is broken. The projecting point 61' on the disk 61 coming in contact with the projecting point 64' on the loop 64 of the lever 63 the revolution of said disk 61 is stopped, and consequently the operation of the pinion 58, gear 57, shaft 8, and the motor apparatus, so that the damper connected with the shaft 8 is partially opened or closed and remains in that position, the motor apparatus having stopped. The weight of the lever 63 causes it to gradually move down from the position shown in Fig. 8 into the position shown in Fig. 7; but the downward movement thereof is controlled and retarded by the clock-movement, for the pawl 77 on the lever 63, engaging with the ratchet-wheel 76, will turn said ratchet-wheel, also the gear 75, pinion 78, and escapement-wheel 79. The movement of said escapement-wheel 79 is controlled by the movement of the escapement-lever 81 in the ordinary way. The time consumed by the downward movement of the lever 63, during which time the damper remains in the same position, may be predetermined and controlled, as desired, by the arrangement of gears, &c., connected with the clock-movement. When the operating-lever 63 reaches its lowest position, as shown in Fig. 7, the switch-lever 68 will be moved to the right, in contact with the contact-point 73, to complete the circuit. Now if the thermostat finger or lever 48 has not moved the apparatus will start up again, the circuit being completed and the operating-lever 63 again raised, the shaft 8 and lever 33 being given another partial revolution to move the damper or valve still farther, and this operation is repeated as long as the thermostat finger or lever remains at the left, in the position shown in Fig. 9, until the continued partial rotation of the shaft 8 and lever 33 causes said shaft and lever to make a half-revolution, the damper or valve being fully opened or moved to its greatest extent, when the end of the lever 33 will strike against the central projection 87 on the lever 84 and move the lever to the right, as shown in Fig. 12, and move the arm 84' out of contact with the contact-point 90, thus breaking the circuit and stopping the apparatus, which will not again start until the temperature acts on the thermostat-finger 48 and moves it to the right in Fig. 9 and in contact with the conductor 97, as shown by dotted lines. The circuit will then be closed, provided the switch-lever 68 is in contact with the contact-point 73, and the motor apparatus will operate in a reverse direction, in the same manner as above described, and gradually close the valve or damper, provided the thermostat-finger remains in the position to the right, Fig. 9. In case the thermostat moves to the opposite position, as shown by dotted lines in Fig. 9, while the lever 63 is moving down, then when the lever has completed its downward movement, as shown in Fig. 7, the switch-lever 68 will be in contact with the contact-point 73 and the circuit will be closed, so that the current will pass through the wire or conductor 97, the outer field 93, the conductor 96, contact-point 91, arm 84" of the lever 84, (said lever being in the position shown in Fig. 11,) wire or conductor 42, brush 40, armature 3, brush 41, wire or conductor 73', switch-lever 68, wire or conductor 72, generator or battery jars 46, and wire or conductor 47 to the thermostat-finger, causing the armature to revolve in an opposite direction and the shaft 8 and lever 33 to revolve in the opposite direction and move the damper or valve to its original position, the movement of the shaft 8 and lever 33 moving the switch-lever 84 to its first position, as shown in Figs. 9 and 10.

I will now describe the modified construction of the switch device combined directly with and mounted on the shaft 8 of the motor apparatus, as shown in Figs. 13 to 23, inclusive.

Referring to Fig. 13, on the shaft 8 is fast an arm or finger 98, which as the shaft 8 revolves in one direction, in the manner above described, will strike against a pin 99 on the front edge of the field-casting 4 and limit the rotation of said shaft 8 in that direction, and as the shaft 8 revolves in the opposite direction the finger 98 will strike against the pin 100 (see Figs. 13 and 14) and limit the rotation of the shaft 8 in that direction. Said shaft is thus limited to a half-revolution. Mounted on the shaft 8, in this instance on the opposite side of the field-casting 4 from the finger 98, is the switch device, consisting, preferably, of a sleeve or collar 101, of wood or other non-conductor material, which is covered with copper or a conductor-surface 102, which is cut away on opposite sides and at the edges of the collar, as shown in Fig. 13, to leave the wood or non-conductor surface 103 exposed. The copper or conductor surface 102 extends entirely around the central portion of the collar 101, (see Figs. 18 and 21,) while it only extends partially around at each end of the collar 101. (See Figs. 17, 19, 20, and 22.) Two contact-wires 104 and 105 extend upon one side of and in contact with the collar 101, and one wire 106 extends upon the other side and in contact with said collar 101. (See Figs. 13 and 23.) The electric current will pass from the wire 104 through the conductor-surface 102 to the wire 106, or from the wire 105 through the conductor-surface 102 to the wire 106 to complete the circuit, according as the shaft 8 and switch device or collar 101 is in one position or the other, when said shaft and collar are given a half-rotation.

Figure 23:
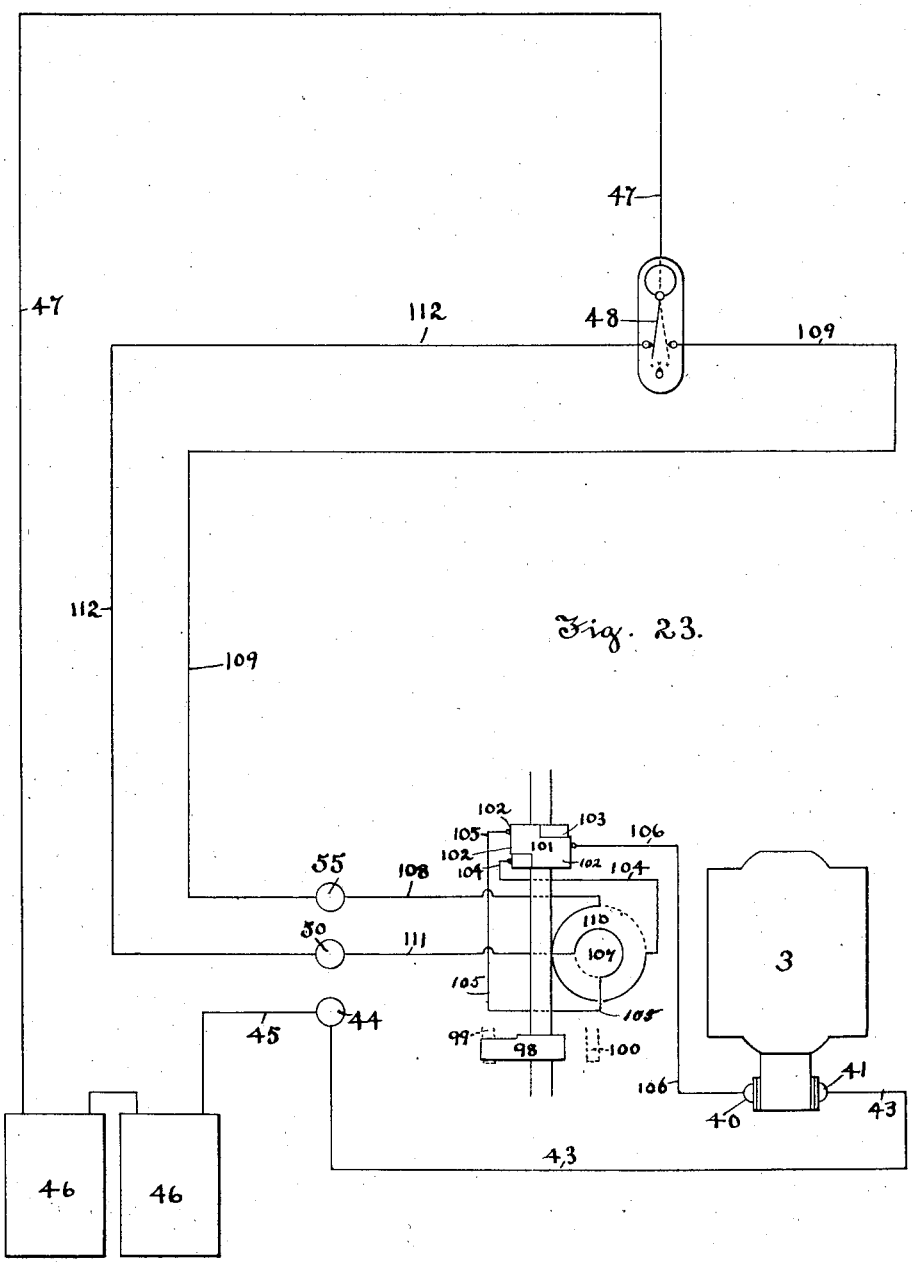

Referring now to Fig. 23, similar parts are designated by the same figures, as in Figs. 6 and 9. From one side of the switch device 101 the wire 104 leads to the outer field-coil 110, and from said coil 110 a wire or conductor 108 leads to the binding-post 55, and from said binding-post a wire or conductor 109 leads to the thermostat 48. From the same side of the switch device 101 the wire 105 leads to the inner field-coil 107, and from said coil 107 a wire or conductor 111 leads to the binding-post 50, and from said binding-post a wire or conductor 112 leads to the thermostat 48. From the thermostat 48 a wire or conductor 47 leads to the battery-jars 46, and from the jars 46 a wire 45 leads to the binding-post 44, and from said post a wire 43 leads to the brush 41, and through the armature 3 to the brush 40, and from said brush 40 the wire 106 leads to the switch device or collar 101 upon the opposite side thereof to the wires 104 and 105. When the finger of the thermostat 48 is moved to the left, as indicated by full lines, Fig. 23, the electric current will pass from the jars 46 through conductor 47, thermostat-finger 48, conductor 112, binding-post 50, inner field-coil 107, conductor 105 to the conductor-surface 102 on the switch device 101, and through said surface to the wire 106, through said wire to the brush 40, and through the armature 3 and brush 41 and conductor 43 to the binding-post 44, and through conductor 45 to the jars 46, thus completing the circuit and putting into operation the revolving armature and causing the shaft 8 to have a half-revolution and move the lever 10, Fig. 13, to open or close the dampers, as above described. At the end of a half-revolution the finger 98 strikes against the pin 100 and stops the shaft 8. The half-revolution of the shaft 8 has given a half-revolution to the switch device or collar 101, so that it will be in the position shown in Fig. 16. The revolution of the switch 101 has brought the non-conductor surface 103 against the wire 105 (see Fig. 22) and has thus broken the circuit and stopped the revolving armature. At the same time the conductor-surface 102 on the switch 101 has been brought into contact with the wire 104, as shown in Fig. 20. Now when the finger of the thermostat 48 is moved to the right, as shown by dotted lines, Fig. 23, the current will pass from the jars 46, through conductor 47, thermostat-finger 48, conductor 109, to binding-post 55, and through conductor 108 to the outer field-coil 110, through said coil and conductor 104 to the conductor-surface 102 on the switch 101, (see Fig. 20,) through said surface 102 to conductor 106, and through brush 40, armature 3, brush 41, and conductor 43 to the binding-post 44, and through conductor 45 to the jars 46, thus completing the circuit and putting the revolving armature in operation to revolve the shaft 8 and switch device 101 in the opposite direction until the finger 98 strikes against the pin 99. This revolution of the switch device 101 moves the conductor-surface 102 out of engagement with the wire 104, as shown in Figs. 13, 17, and 23, and breaks the circuit. At the same time the wire 105 is in contact with said surface 102, as shown in said figures, and when the thermostat-finger 48 is moved to the right, as shown by dotted lines in Fig. 23, the circuit is again completed, as above described.

It will be understood that if the thermostat-finger is in an intermediate position the motor apparatus and dampers or valves will remain stationary.

The advantages of my automatic temperature-regulating apparatus will be readily appreciated by those skilled in the art. It is of simple construction and operation, and in connection with a thermostat or other similar device and an electric generator and electrical connections or conductors the temperature is automatically regulated by operating the dampers or valves. The switch mechanism of my apparatus controls automatically the movement of the motor in one direction or the other to open or close the dampers. The shaft of the motor, which through connections operates the dampers or valves, is positively stopped after it has made a partial revolution in either direction by the engagement of a lever or finger thereon with a stop or switch without stopping the gear which operates said shaft. Said gear may continue to revolve until its momentum ceases.

By means of my supplemental attachment I am enabled to regulate the position of the dampers or valves, &c., and also the time during which they remain in their positions.

It will be understood that the details of construction of my apparatus may be varied from what is shown and described, and it may be used in connection with any kind of heating or ventilating system, and the motor may be operated by electricity or other power. The particular construction of the switch mechanisms shown in the drawings may be varied, if desired, and instead of a clock-movement for controlling the reverse movement of the lever 63 or other operative device to close the circuit any other well-known mechanism or device may be used.

Having thus described my invention, what I claim as new, and desire to secure by Letters Patent, is—

1. In a temperature-regulating apparatus, the combination with a heat-controlling damper or other device, and connections to a motor, of said motor operated by electricity, and consisting of a revolving armature, a field-coil, a shaft operated by the armature through a gear loose on said shaft, but adapted to be clutched thereto to turn the same, said shaft adapted to revolve in either direction, and to be positively stopped at the end of each movement, a switch mechanism adapted to be operated automatically by the revolution of said shaft, to automatically cause the electric current to pass in one direction or the other through the field-coil, to operate the armature and the shaft in one direction or the other, and move the damper, and electrical connections from said motor to a generator or electric source, substantially as set forth.

2. In a temperature-regulating apparatus, the combination with a heat-controlling damper or other device, and connections to a motor, of said motor operated by electricity, and consisting of a revolving armature, a field-coil, a shaft operated by the armature through a gear loose on said shaft, but connected therewith to turn the same, said shaft adapted to revolve in either direction, and to be positively stopped at the end of each movement, a switch mechanism adapted to be operated automatically by the revolution of said shaft, to automatically cause the electric current to pass in one direction, or the other through the field-coil, to operate the armature and the shaft in one direction, or the other, and move the damper, and electrical connections from said motor to a generator, or electric source, substantially as set forth.

3. In a temperature-regulating apparatus, the combination with a heat-controlling damper or other device for controlling the passage of air, and connections to a motor, of said motor operated by electricity, and consisting of an armature, a field-coil, a shaft operated by the armature, through a gear loose on said shaft, but connected therewith to turn the same, said shaft adapted to revolve in either direction, and to be positively stopped at the end of each movement, by a lever or finger on said shaft engaging with a stop, or switch in the path of said lever, a switch mechanism adapted to be operated automatically by the revolution of said shaft, to automatically cause the electric current to pass in one direction, or the other, through the field-coil, to operate the armature and the shaft in one direction or the other, and move the damper; and electrical connections from said motor to a generator; and a thermostat, substantially as set forth.

4. In a motor operated by electricity, the combination with a shaft adapted to revolve in either direction, and operated by a revolving armature, and having an arm or lever fast thereon, to engage and move a switch, and stop the rotation of the shaft and said switch, and a disk fast on said shaft, of a gear or pulley loose on said shaft, and two clutch members pivoted on said gear, said clutch members adapted to extend upon the periphery of said disk, and a spring connecting the ends of said clutch members, to cause the disk to be held and turned with said gear, and allow the gear to be turned independently of said disk, when the shaft is stopped, substantially as set forth.

5. In a heat-regulating apparatus, the combination with a thermostat, connections therefrom to a motor, and said motor, operated by electricity, and adapted to operate a heat-controlling damper or dampers, and said damper or dampers, and connections therefrom to the motor, of mechanism for controlling the operation of said motor, and connected therewith, comprising an operating-lever, and means for automatically moving the same in one direction to break the circuit and stop the motor, and a clock-movement for controlling the reverse movement of said lever, to close the circuit, substantially as set forth.

6. In a motor operated by electricity, the combination with a shaft adapted to revolve in either direction, and to be positively stopped at the end of a predetermined movement, and a gear or pulley loosely mounted on said shaft, but connected therewith to turn said shaft, of a switch, or switch mechanism operated by the revolution of said shaft, substantially as set forth.

7. In a motor operated by electricity, the combination with a shaft adapted to revolve in either direction, and to be positively stopped at the end of a predetermined movement, and a gear or pulley loosely mounted on said shaft, but connected therewith to turn said shaft, of a switch or switch mechanism, substantially as set forth.

8. In a heat-regulating apparatus, the combination with an electric motor or device for controlling the movement of dampers or valves, a shaft operated by said motor to revolve in either direction, of means for controlling the operation of said shaft, comprising an operating lever or device, and means for automatically moving the same in one direction to break the circuit and stop the shaft, and means for controlling the reverse movement of said lever, substantially as shown and described.

9. In a heat-regulating apparatus, the combination with an electric motor or device for controlling the movement of dampers or valves, a shaft operated by said motor to revolve in either direction, of means for controlling the operation of said shaft, comprising an operating lever or device, and means for automatically moving the same to open or close the circuit, substantially as shown and described.

10. In a heat-regulating apparatus, the combination with an electric generator, connections to an electric motor, and said motor, consisting of a revolving armature, a field coil or coils, a shaft operated by the armature and adapted to revolve in either direction, of means for controlling the operation of said shaft, comprising an operating-lever, and means for automatically moving the same in one direction to break the circuit and stop the shaft, and means for automatically controlling the reverse movement of said lever to close the circuit, substantially as set forth.

11. In a heat-regulating apparatus, the combination with a motor or device for controlling the movement of dampers or valves, a shaft operated by said motor to revolve in either direction, of means for controlling the operation of said shaft, comprising an operating lever or device, and means for automatically moving the same, substantially as shown and described.

WALTER B. LORING.

Witnesses:
M. J. GALVIN,
J. C. DEWEY.